United States Patent [19]

Dallmann et al.

[11] 4,381,329

[45] Apr. 26, 1983

[54] THERMOPLASTIC FILM FOR USE IN THE MANUFACTURE OF FORGERY-RESISTANT IDENTIFICATION DOCUMENTS

[75] Inventors: Hermann Dallmann, Wiesbaden; Hans J. Palmen, Walluf, both of Fed. Rep. of Germany

[73] Assignee: Hoechst Aktiengesellschaft, Frankfurt am Main, Fed. Rep. of Germany

[21] Appl. No.: 281,381

[22] Filed: Jul. 8, 1981

[30] Foreign Application Priority Data

Jul. 9, 1980 [DE] Fed. Rep. of Germany ....... 3025931

[51] Int. Cl.³ .................. B32B 3/00; B32B 27/32; B32B 27/30
[52] U.S. Cl. ................... 428/204; 40/626; 283/70; 283/75; 156/272.6; 156/308.2; 156/334; 428/201; 428/206; 428/412; 428/423.7; 428/424.4; 428/475.8; 428/510; 428/518; 428/520; 428/522; 428/523; 428/910; 428/916
[58] Field of Search ............... 428/916, 522, 201, 204, 428/206, 412, 475.8, 510, 910, 423.7, 424.4, 523, 520, 518, 483; 40/2.2; 283/7; 156/272.6, 334, 308.2

[56] References Cited

U.S. PATENT DOCUMENTS

| B 480,591 | 3/1976 | Bildusas | 156/220 |
|---|---|---|---|
| 3,413,171 | 11/1968 | Hannon | 428/916 |
| 3,566,521 | 3/1971 | Conner | 428/916 |
| 3,595,740 | 7/1971 | Gerow | 428/349 |
| 3,949,114 | 4/1976 | Viola | 428/337 |
| 4,070,774 | 1/1978 | Staats et al. | 40/2.2 |
| 4,082,854 | 4/1978 | Yamada | 428/522 |
| 4,093,489 | 6/1978 | Hong | 156/245 |
| 4,096,015 | 6/1978 | Kawamata | 428/916 |
| 4,101,701 | 7/1978 | Gordon | 428/916 |
| 4,115,618 | 9/1978 | MacLeish et al. | 428/204 |
| 4,239,826 | 12/1980 | Knott | 428/520 |
| 4,322,461 | 3/1982 | Raphael | 40/2.2 |

FOREIGN PATENT DOCUMENTS

| 2736852 | 8/1977 | Fed. Rep. of Germany . |
|---|---|---|
| 2932575 | 3/1980 | Fed. Rep. of Germany . |
| 2302933 | 3/1976 | France . |
| 888359 | 4/1960 | United Kingdom . |

*Primary Examiner*—Ellis P. Robinson
*Attorney, Agent, or Firm*—Schwartz, Jeffery, Schwaab, Mack, Blumenthal & Koch

[57] ABSTRACT

A thermoplastic protective film for use in the manufacture of forgery-resistant identification documents, comprising a base layer and a cover layer comprising a partially hydrolyzed olefin/vinyl ester copolymer. The cover-layer side of the film is laminated under the action of heat to the identification document.

26 Claims, No Drawings

THERMOPLASTIC FILM FOR USE IN THE MANUFACTURE OF FORGERY-RESISTANT IDENTIFICATION DOCUMENTS

The present invention relates to a coated film which is suitable for use as a protective film in the manufacture of forgery-resistant identification documents carrying a photograph.

BACKGROUND OF THE INVENTION

Identification documents, such as identity cards, passports, drivers licenses etc. are sometimes tampered with by exchanging the photograph and/or by its altering the information contained in the documents. Great efforts are therefore undertaken to render such identification documents forgery-resistant.

British Pat. No. 888,359 discloses applying a cover sheet and a back sheet of polyester film to identification cards in which a photograph is mounted on a paper core sheet. The polyester film is provided with a coating of thermoplastic adhesive, by which it is then bonded to the paper core. The adhesion of this film is, however, not very high, and it is consequently still relatively easy to peel the cover film off the support without damaging the support.

To improve adhesion, it has been proposed in U.S. Pat. No. 3,413,171 to coat the paper support with a thermoplastic adhesive layer of the same kind. But also in this case, it is apparent that the thermoplastic bonding material adheres poorly to the surface of the photograph, and the protective covering still comes off the support or can be removed by unauthorized persons without leaving any noticeable trace on the photograph.

German Auslegeschrift 2,736,852 discloses protective coverings for identification cards, in which the thermoplastic adhesive layer of the cover sheet is provided with an additional coating to improve bonding, the coating being applied in the form of a pattern. There is, however, no indication as to the adhesion of the protective covering, in particular under thermal stress or upon treatment with solvents. It is also a disadvantage of this film that it is technically difficult and expensive to manufacture. The protective covering is apparently intended for bonding only to photographs which are still moist.

U.S. Pat. No. 4,093,489 describes protective coatings for photographs, which consist of thermosetting catalyst-containing melamine/formaldehyde condensation products. The coatings are cured at high pressure for a period ranging between 3 and 10 minutes, depending on the circumstances of each particular case. This process has the disadvantage that, due to the long pressing times required, it is unsuitable for a continuous operation in which the material is continuously taken off a roll.

U.S. Pat. No. 4,115,618 discloses protective sheets for identification cards which comprise a cellulose triacetate layer which is hydrolized on one surface and, bonded thereto, a layer consisting of a mixture of polyvinyl alcohol and polyvinyl acetate. A drawback of this film is that lamination must be effected while the photograph is moist.

A film which is intended to be used as a protective covering in the manufacture of forgery-resistant identification documents must meet numerous requirements. The laminated protective film should withstand any attempt to detach it from the support at room temperature or even upon heat treatment. It should be readily weldable and resistant to delamination, even when treated with conventional organic solvents. Foremost, however, it must adhere so firmly to the gelatin layer of the photograph that it cannot be detached under the above-specified conditions without destroying the photograph. In addition, the film must be scratch-resistant, fast to light, free of yellowing and ageing-resistant. If the information carriers are contained in the identification card in the form of an embossing, the protective film must additionally be capable of being embossed satisfactorily, i.e. quickly and with sharp outlines, and embossing must not lead to cracks or fissures.

None of the coatings described hereinabove meet all these requirements simultaneously.

SUMMARY OF THE INVENTION

Accordingly it is an object of the present invention to provide a film for manufacture of identification documents which adheres strongly to a core sheet.

Another object of the present invention is to provide a film for manufacture of identification documents which cannot be removed from a photograph without destroying the photograph.

A further object of the present invention is to provide a film for the manufacture of identification documents which adheres well even at elevated temperatures.

It is also an object of the present invention to provide a film for manufacture of identification documents which resists separation when treated with solvents.

An additional object of the present invention is to provide a film for manufacture of identification documents which is relatively easy and inexpensive to manufacture.

Yet another object of the present invention is to provide a film for manufacture of identification documents which can be applied in a short period of time and facilitates continuous production techniques.

A still further object of the present invention is to provide a film for manufacture of identification documents which can be readily applied over a photograph even after the photograph is dry.

Another object of the present invention is to provide a film for manufacture of identification documents which is readily weldable or heat-sealable.

It is also an object of the present invention to provide a film for manufacture of identification documents which is scratch-resistant, light stable, resistant to ageing and does not yellow.

A further object of the present invention is to provide a film for manufacture of identification documents which can be satisfactorily embossed.

These and other objects of the invention are achieved by providing a multi-layer, thermoplastic protective film for use in the manufacture of forgery-resistant identification documents, said film comprising a base layer and a cover layer comprising a partially hydrolyzed olefin/ester copolymer.

Surprisingly, it has been found that such a protective film laminated to an identification document can not be detached at room temperature and even upon heat treatment up to a temperature exceeding 100° C., without destroying the base, particularly the photograph. Furthermore, such a film allows good and fast sealing, it is scratch-resistant, fast to light, resistant to ageing and solvents, and it can be embossed with sharp outlines.

DETAILED DESCRIPTION OF PREFERRED EMBODIMENTS

In the manufacture of a forgery-resistant identification document, the cover layer side of the protective film is laminated under the action of heat to the identification document. The document suitably comprises a core carrying identifying information and, optionally, a photograph. If desired, the resulting laminate can be hot embossed under pressure.

The cover layer preferably comprises a partially hydrolyzed ethylene/vinyl ester copolymer. A partially hydrolyzed ethylene/vinyl acetate copolymer is particularly preferred because it is readily available. In particular, polymers have proved suitable, in which the olefin content, preferably the ethylene content, amounts to at least 29 mole percent.

The degree of hydrolysis of the cover-layer polymer is preferably in the range between 20 and 99 percent. The selection of polymers which can be used for the cover layer depends principally on the sealing conditions and on the mechanical strength of the protective film and the base.

In addition to the pure, partially hydrolyzed olefin/vinyl ester copolymers, mixtures of such copolymers with compatible polymers can also be used for the cover layer. Preferably, the polymers to be admixed carry carbonyl groups. Typical examples include ethylene/vinyl acetate copolymers, ethylene/acrylic acid or ethylene/acrylic acid ester copolymers, polyesters, polyamides and polyurethanes. It is also possible to add resins, such as terpene resins.

The base layer and also the cover layer may contain the usual additives, for example, anti-oxidants, pigments, dyes etc. The choice and the amount of the additives depends largely on the desired transparency of the final film, the compatibility, e.g. under thermal stress, and the unimpaired sealability of the cover layer.

As the base layer any films are actually suitable which are scratch-resistant and ageing-resistant and which do not yellow, even after a prolonged period of time. Preferred base layers comprise films of polyvinyl chloride, polyester, polycarbonate, polyamide, cellulose acetobutyrate and cellulose acetate. Polyester films are preferred, particularly polyethylene terephthalate films.

The films may be employed in the non-oriented state. Preferably, however, they are used in the stretched and heat-set state because such films exhibit a higher mechanical strength and little or no shrinkage under thermal stress.

The total thickness of the protective film can be varied and depends substantially on the requirements of the particular case. If the identification document is intended to be embossed after lamination of the protective film, the layer thickness must additionally be adapted to the embossing conditions including temperature, pressure, and required depth of embossing. Films of soft-flowing and readily deformable polymers, such as polyvinyl chloride, require only small pressing pads, while embossing of films such as oriented polyester films becomes difficult with increasing layer thickness.

Various methods may be used to produce the protective film. Film can be prepared from partially hydrolyzed olefin/vinyl ester copolymer and then laminated to the base layer, preferably by means of an adhesion-promoting layer. It is also possible to start with the base film and, preferably after the application of an adhesion-promoting layer, melt-coat the base film with the olefin/vinyl ester copolymer. Alternatively, the protective film may be produced by coextending the polymers and uniting the layers in the thermoplastic state.

If adhesion-promoters are used, such products are preferably employed which, after cross-linking, still exhibit a sufficient adhesion under thermal stress acting on the protective film. Suitable examples include urethane prepolymers cross-linked with expoxides or similar products.

If desired, the cover layer of the partially hydrolyzed olefin/vinyl ester copolymer may be provided with an additional layer, for example, to further improve the adhesion on the base or on the photograph. This layer is preferably printed on in a discontinuous pattern, the pattern being especially designed in such a way that tearing lines cannot form in any attempt to detach the protective film from the identification document.

As the additional layer, polymer solutions of polyamides, polyesters, polyurethanes or ethylene vinyl acetate may be applied. Polymers which adhere to the cover layer without further intermediate layers, which form a layer which does not tend to blocking, and which do not substantially affect the transparency of the protective film, are preferred.

The protective film is preferably subjected to a corona treatment, either immediately after manufacture or shortly before it is laminated to the identification document. It has been found that such a treatment may further enhance the adhesion between the base and the protective film.

Further details of the invention will become apparent from a consideration of the following non-limiting examples.

EXAMPLE 1

A protective film made up of the following layers was prepared by melt-coating:
a. biaxially stretched and heat-set polyethylene terephthalate layer: 50 μm
b. polyurethane adhesive (UK 3645/UK 6200 supplied by HENKEL GmbH: 4 μm
c. layer comprising 97 percent of a hydrolyzed ethylene/vinyl acetate copolymer having an ethylene content of about 45 mole percent: 120 μm After a corona treatment, the protectivde film was laminated at 130° C. under pressure with its cover-layer side to normal photographic paper and was then embossed at the same temperature under high pressure.

It was impossible to detach the protective film at room temperature or even at 120° C., without destroying the photographic paper. Even after keeping the material for several days in water and in various customary organic solvents, such as ethyl alcohol, methanol, benzene etc., the protective film could only be detached by destroying the base.

EXAMPLE 2

A protective film made up of the following layers was prepared by melt-coating:
a. biaxially stretched and heat-set polyethylene terephalate film: 50 μm
b. polyurethane adhesive of Example 1: 4 μm
c. layer composed of a blend of 90 percent by weight of the copolymer of Example 1 and 10 percent by weight of an ethylene copolymer containing carbonyl groups (® Lupolen A 2910 M supplied by BASF AG): 100 μm The protective film was corona-treated and tested as described in Example 1. The same results as in Example 1 were also obtained with this film.

EXAMPLE 3

The cover layer of the protective film of Example 1 was partially printed in the form of a pattern with a sealable polyamide layer, and the printed layer was subjected to a corona treatment.

The tests carried out and the results obtained corresponded to Example 1.

EXAMPLE 4

A protective film composed of polyamide 6 (50 μm) and of the copolymer of Example 1 (150 μm) was prepared by coextrusion.

After corona treatment, the tests of Example 1 were performed.

The results obtained corresponded to those given in Example 1.

EXAMPLE 5

The procedure of Example 1 was repeated, with the exception that the cover layer was composed of a blend of 60 percent by weight of the partially hydrolyzed ethylene/vinyl acetate copolymer of Example 1 and 40 percent by weight of a copolyamide (® Durethan C 38F supplied by BAYER AG). The test results obtained were the same as in Example 1.

The foregoing embodiments have been described merely as examples of the invention and are not intending to be limiting. Since modifications of the disclosed embodiments incorporating the spirit and substance of the invention may occur to persons skilled in the art, the scope of the invention is to be limited solely with respect to the appended claims.

What is claimed is:

1. A forgery-resistant identification document comprising a core carrying identifying information, said core having laminated thereto the cover layer side of a thermoplastic protective film comprising a base layer and a cover layer comprising a partially hydrolyzed olefin/vinyl ester copolymer, the degree of hydrolysis of said copolymer lying in the range from 20 to 99 percent, said laminated protective film being impossible to detach from said document at temperatures up to and as high as 120° C. without destroying said document.

2. A forgery-resistant identification document according to claim 1 wherein said cover layer comprises a partially hydrolyzed ethylene/vinyl ester copolymer.

3. A forgery-resistant identification document according to claim 2 wherein said cover layer comprises a partially hydrolyzed ethylene/vinyl acetate copolymer.

4. A forgery-resistant identification document according to claim 1 wherein said olefin/vinyl ester copolymer has an olefin content of at least 30 mole percent.

5. A forgery-resistant identification document according to claim 1 wherein said cover layer comprises a mixture of said partially hydrolyzed copolymer and at least one additional polymer compatible therewith.

6. A forgery resistant identification document according to claim 5 wherein said additional polymer contains carbonyl groups.

7. A forgery-resistant identification document according to claim 1 wherein said cover layer carries a further layer printed thereon in the form of a discontinuous pattern.

8. A forgery-resistant identification document according to claim 1 wherein said base layer is composed of a material selected from the group consisting of polyvinyl chloride, polyester, polycarbonte, polyamide, cellulose acetobutyrate and cellulose acetate.

9. A forgery-resistant identification document according to claim 8 wherein said base layer is oriented and heat-set.

10. A forgery-resistant identification document according to claim 8 wherein said base layer comprises polyethylene terephthalate.

11. A forgery resistant identification document according to claim 10 wherein said base layer is biaxially stretched and heat-set.

12. A forgery-resistant identification document according to claim 1 further comprising an adhesion-promoting layer between said base layer and said cover layer.

13. A forgery-resistant identification document according to claim 1 wherein the cover layer surface of said protective film is corona-treated prior to lamination.

14. A method of protecting an identification document against forgery comprising laminating to said document the cover layer side of a thermoplastic protective film comprising a base layer and a cover layer comprising a partially hydrolyzed olefin/vinyl ester copolymer, the degree of hydrolysis of said copolymer lying in the range from 20 to 99 percent, said laminated protective film being impossible to detach from said document at temperatures up to and as high as 120° C. without destroying said document.

15. A method according to claim 14 wherein said cover layer comprises a partially hydrolyzed ethylene/vinyl ester copolymer.

16. A method according to claim 15 wherein said cover layer comprises a partially hydrolyzed ethylene/vinyl acetate copolymer.

17. A method according to claim 14 wherein said copolymer has an olefin content of at least 30 mole percent.

18. A method according to claim 14 wherein said cover layer comprises a mixture of said partially hydrolyzed copolymer and at least one additional polymer compatible therewith.

19. A method according to claim 18 wherein said additional polymer contains carbonyl groups.

20. A method according to claim 14 wherein said cover layer carries a further layer printed thereon in the form of a discontinuous pattern.

21. A method according to claim 14 wherein said base layer is composed of a material selected from the group consisting of polyvinyl chloride, polyester, polycarbonate, polyamide, cellulose acetobutyrate and cellulose acetate.

22. A method according to claim 21 wherein said base layer is oriented and heat-set.

23. A method according to claim 21 wherein said base layer comprises polyethylene terephthalate.

24. A method according to claim 23 wherein said base layer is biaxially stretched and heat-set.

25. A method according to claim 14 wherein said protective film further comprises an adhesion-promoting layer between said base layer and said cover layer.

26. A method according to claim 14 wherein the cover layer surface of said protective film is corona-treated prior to lamination.

* * * * *